G. H. DAY.
TEMPLE.
APPLICATION FILED DEC. 26, 1917.
1,340,879.
Patented May 25, 1920.
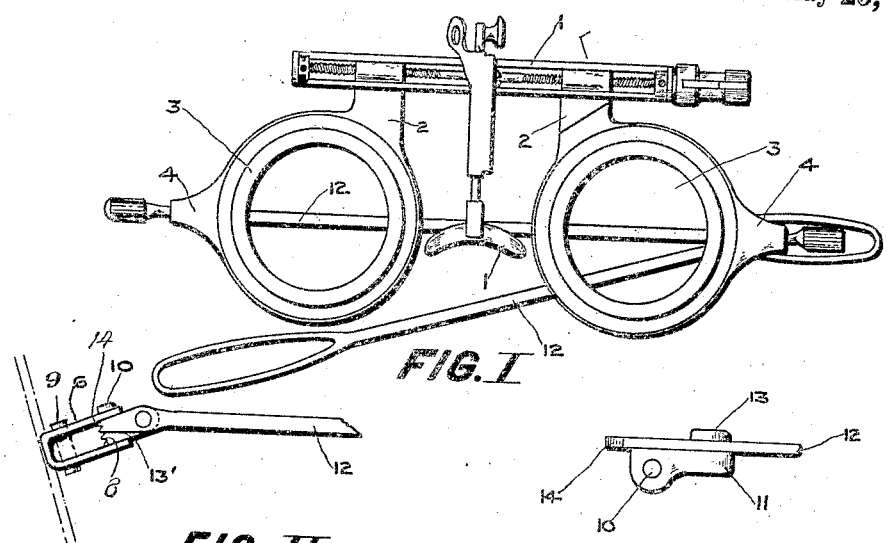
FIG. I
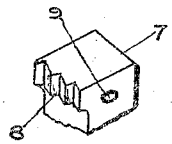
FIG. II
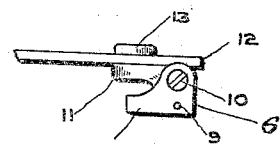
FIG. III
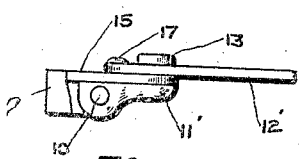
FIG. IV
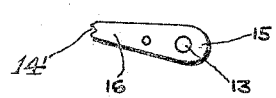
FIG. V
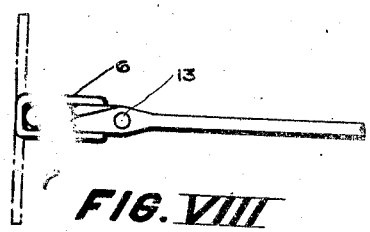
FIG. VI
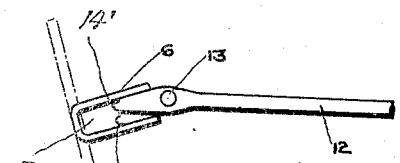
FIG. VII
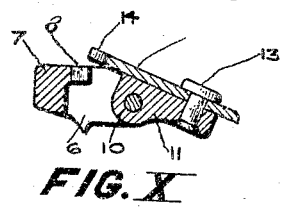
FIG. VIII
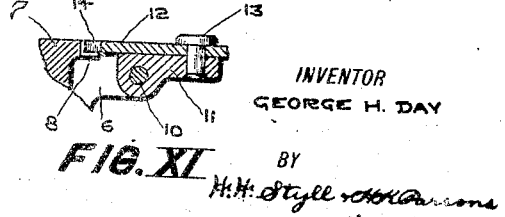
FIG. IX
FIG. X
FIG. XI
INVENTOR
GEORGE H. DAY
BY
H. H. Styll & Parsons
ATTORNEYS

UNITED STATES PATENT OFFICE.

GEORGE H. DAY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

TEMPLE.

1,340,879. Specification of Letters Patent. Patented May 25, 1920.

Application filed December 26, 1917. Serial No. 208,941.

*To all whom it may concern:*

Be it known that I, GEORGE H. DAY, a citizen of the United States, residing at Southbridge, in the county of Worcester and State of Massachusetts, have invented certain new and useful Improvements in Temples, of which the following is a specification.

This invention relates to new and useful improvements in temples, and more particularly to an adjustable temple, the main object of the present invention being the provision of a temple adapted for use on spectacles, trial frames and various other ophthalmic mountings of this character, whereby the temple can be quickly and readily adjusted transversely of the plane of the mounting to accommodate the same with respect to the disposition of the mounting upon the face.

Another object of this invention is the provision of an adjustable temple which can be quickly and readily applied to various forms of ophthalmic mountings and is so mounted that the same can be readily adjusted without removing the mounting from the face.

With the above and other objects in view, the invention consists in the novel features of construction and the combination and arrangement of parts hereinafter more fully set forth, pointed out in the claims and shown in the accompanying drawings, in which:

Figure I is a front elevation of a pair of spectacles illustrating my improved temple applied thereto.

Fig. II is an end elevation of the spectacles showing the temple in side elevation and the application of the same.

Fig. III is a detail plan view of the connecting end of the temple.

Fig. IV is a detail perspective of the retaining member which is engaged by the inner end of the temple for holding the same in an adjusted position.

Fig. V is a plan view of one end of the spectacles showing the temple in folded position.

Fig. VI is a plan view of the inner end of the temple illustrating a slightly modified form of the mounting.

Fig. VII is a plan view of the detachable pivot member which is applied to that form of the invention illustrated in Fig. VI.

Fig. VIII is a side elevation illustrating my adjustable temple in such a position as to retain the lenses in a vertical position before the eyes.

Fig. IX illustrates a slight modification of adjustment of the temple and at the same time illustrates the same in a position whereby to provide for a slanting position to the lens.

Fig. X is a longitudinal sectional view illustrating the temple in its open position with respect to the locking block so that the temple itself can be adjusted from one side to the other, and Fig. XI is a similar view illustrating the temple in its locked position.

Referring to the drawings, the numeral 1 indicates a nose bridge of any well known form of mounting having connected to each end thereof the lens supporting member 2. Attached to the lenses 3 directly or to the frame in which the lenses are mounted is a clip 4 which is applied to each of the lenses at a point diametrically opposite the clips 2 and formed integral with this clip 4 is a substantially U-shaped casing 6 adapted to receive a rectangular block 7 having teeth formed in the upper face thereof, as indicated at 8. This block 7 is securely retained within the casing 6 by means of a transverse pin 9 which extends through the side walls of the casing and through the body portion of the block. This pin 9 may either be in the form of a bolt or in the form of a screw having one end thereof threaded into one side wall of the casing.

Pivotally mounted upon the pin 10 and disposed between the outer tapered ends of the casing is a connecting block 11 which is substantially elongated in form and mounted upon the outer face of this block is the inner end of the temple 12. It will be noted that the pivot pin 13 extends through the temple at a point adjacent the end thereof and into the block 11 adjacent its outer end, thus the inner end of the temple is adapted for swinging movement between the side walls of the casing 6.

As will be noted in Fig. II, the inner end of the temple is tapered, as indicated at 13', while the extreme end thereof is provided with a plurality of teeth 14 adapted for engagement, when the temple is disposed in a horizontal plane, with the teeth 8 of the block 7 to retain the temple in adjusted position. From this it will be noted that by swinging the temple in toward the spectacles the teeth 14 will be disengaged from the teeth 8 to permit of a slight swinging movement of the temple in a plane transversely of the plane of the spectacles, thus the temple may be quickly and readily adjusted in accordance with the adjustment required of the spectacles upon the face.

On the other hand when the temples are swung into what is termed open position, that is in position to engage the face, as distinguished from closed position where the article is folded, the temples will then interlock with the teeth 8 at the ends and will be held while open in proper angularly adjusted position.

In Fig. VI, it will be noted that I have illustrated a slightly modified form of the invention wherein a separate pivot member 15 is attached to the block 11' while the inner end of the temple 12' is connected directly to the pivot member 15. It will be apparent from the drawings that the pivot member 15 is substantially tapered as illustrated at 16, and provided at its outer end with the teeth 14' adapted to mesh with the teeth 8' to retain the temple in an adjusted position. The pivot pin 17 extends through the end of the temple and through the member 15 and block 11' so that by moving the temple 12' it will correspondingly move the member 15. From this it will be apparent that in order to adjust the temple 12' the same operation will be carried out as that illustrated in the preferred form of the invention.

It will be noted from the illustration in Fig. IX that I have provided a slight modification of means for engaging the end of the temple with the block 7. This is carried out by providing a single tooth at the inner end of the temple as illustrated at 14' and engaging the same within the recesses 8' of the block 7. This form of the invention may be used in place of the engaging teeth 8 and 14 as illustrated in the preferred form of the invention.

In Figs. X and XI it will be noted that I have illustrated the two positions of the temple: viz., the position to which the same is swung when it is desired to adjust the lenses to a slanting position as illustrated in Fig. IX and to a position whereby the temple will be locked against movement with respect to the block 7.

I claim:

1. A device of the class described, including a casing, a toothed block, disposed within the casing, a pivoted temple supported by the casing, and means carried by the temple for engagement with the teeth on the block to retain the temple in an adjusted position.

2. A device of the class described, including a U-shaped casing, a toothed block carried by the casing, a pivoted temple mounted for swinging movement between the walls of the casing, and teeth formed upon the inner end of the temple for engagement with the teeth of the aforesaid block to retain the temple in an adjusted position.

3. A device of the class described, including a U-shaped casing, a toothed block carried by the casing, a connecting member pivotally mounted between the outer ends of the casing for swinging movement, a temple pivotally secured to the outer end of the connecting member, and teeth formed upon the inner end of the temple for engagement with the teeth on the block to retain the temple in an adjusted position.

4. A mounting of the character described including a frame portion, a head engaging portion and a connection between said parts including a folding member hinged to the frame, a pivotal connection between the head engaging member and the folding member, and means on the frame to engage the head engaging portion and lock it against pivotal movement when the folding member is in opened position.

5. In a device of the character described, the combination with a frame portion and a temple portion, of an intermediate connecting member having pivotal connection with both of said parts, and interlocking means on the frame and the temple for limiting the pivotal movement of the parts in one direction and preventing movement of the parts on the other pivot connection when the device is in operative position.

6. In a device of the character described, the combination with a frame having a toothed portion, of a connecting block hinged to the frame and a head engaging member pivoted to the block and having a portion interlocking with the teeth of the frame when swung into open position to hold the head engaging member against pivotal movement but disengageable from the teeth to permit pivotal movement as the parts are swung into folded position.

7. An angularly adjustable temple connection for trial frames including a frame having a plurality of locking portions, a connecting block hinged to the frame and a temple pivoted to the block and having a portion projecting to one side for engagement with the head and at the opposite side for engagement with the locking members of the frame, said projection being disposed to be brought into and out of operative engagement with the frame upon opening and folding of the temple, substantially as illustrated.

8. In a testing frame the combination with a frame portion, of a locking device carried thereby, a hinge block swinging adjacent the locking device, a head engaging member adjustably mounted on the hinge block and a locking member therefor projecting beyond the hinge block to engage the frame lock as the hinge is moved into open position.

In testimony whereof I have affixed my signature, in presence of two witnesses.

GEORGE H. DAY.

Witnesses:
WILLIAM B. JONES,
WM. P. CHASE.